(12) United States Patent
Stachowiak (10) Patent No.: US 6,605,358 B1
(45) Date of Patent: Aug. 12, 2003

(54) LOW-E MATCHABLE COATED ARTICLES, AND METHODS

(75) Inventor: Grzegorz Stachowiak, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/985,320

(22) Filed: Nov. 2, 2001

Related U.S. Application Data
(60) Provisional application No. 60/318,676, filed on Sep. 13, 2001.

(51) Int. Cl.[7] ................................................ B32B 17/06
(52) U.S. Cl. .................... 428/432; 428/34; 428/428; 428/448; 428/689; 428/697; 428/698; 428/699; 428/704; 427/163.1; 427/165
(58) Field of Search ................................. 428/428, 432, 428/448, 673, 697, 698, 699, 701, 702, 34, 689, 704; 427/162, 163.1, 165

(56) References Cited

U.S. PATENT DOCUMENTS

| | | | |
|---|---|---|---|
| 3,682,528 | A | 8/1972 | Apfel et al. |
| 5,188,887 | A | 2/1993 | Linge et al. |
| 5,298,048 | A | 3/1994 | Lingle et al. |
| 5,342,675 | A | 8/1994 | Kobayashi et al. |
| 5,344,718 | A | 9/1994 | Hartig et al. |
| 5,376,455 | A | 12/1994 | Hartig et al. |

(List continued on next page.)

FOREIGN PATENT DOCUMENTS

| | | |
|---|---|---|
| EP | 0 567 735 | 11/1993 |
| EP | 0 796 825 | 9/1997 |
| WO | WO 01/40131 | 6/2001 |
| WO | WO 01/66483 | 9/2001 |
| WO | WO 02/062717 | 8/2002 |

OTHER PUBLICATIONS

U.S. Provisional Application Ser. No. 60/318,676 filed Sep. 13, 2001.
"High Temperature Corrosion", Per Kofstad, Dept. of Chemistry, Univ. of Oslo, Norway, Elsevier Applied Science, London and New York, 1988, pp. 360–371. (no month).
Optical Interference Coatings, Jun. 5–9, 1995, "Durable Silver–Based Antireflection Coatings and Enhanced Mirrors", pp. 115–117, 1995 Technical Digest Series, vol. 17. No Month.

*Primary Examiner*—Deborah Jones
*Assistant Examiner*—Andrew T Piziali
(74) *Attorney, Agent, or Firm*—Nixon & Vanderhye P.C.

(57) ABSTRACT

A heat treatable coated article including an infrared (IR) reflecting layer (e.g., of or including Ag), the coated article being able to attain a ΔE* (glass side) no greater than about 3.5, more preferably no greater than 3.0, and even more preferably no greater than 2.6, following or due to heat treatment (e.g., thermal tempering). Accordingly, low-E (i.e., low emissivity) coated articles of certain embodiments of this invention appear from the glass side thereof visually similar to the naked eye both before and after heat treatment. Good matchability characteristics (i.e., low ΔE* values) combined with good durability can be achieved by controlling to what extent barrier layer(s) in contact with the IR reflecting layer are nitrided and to what thickness(es) they are sputtered. Optionally, certain embodiments of this invention relate to coated articles that also have high visible transmission and/or good durability. Coated articles herein may be used in the context of insulating glass (IG) window units, vehicle windows, or any other suitable applications. In certain embodiments of this invention, an exemplary layer stack includes: glass/$Si_3N_4$/$NiCrN_x$/Ag/$NiCrN_x$/$Si_3N_4$. Other materials may instead be used without departing from the scope and/or spirit of the instant invention which is a low-E matchable and/or durable product.

34 Claims, 3 Drawing Sheets

U.S. PATENT DOCUMENTS

| | | |
|---|---|---|
| 5,377,045 A | 12/1994 | Wolfe et al. |
| 5,514,476 A | 5/1996 | Hartig et al. |
| 5,563,734 A | 10/1996 | Wolfe et al. |
| 5,688,585 A | 11/1997 | Lingle et al. |
| 5,770,321 A | 6/1998 | Hartig et al. |
| 5,800,933 A | 9/1998 | Hartig et al. |
| 5,942,338 A | 8/1999 | Arbab et al. |
| 6,014,872 A | 1/2000 | Hartig et al. |
| 6,059,909 A | 5/2000 | Hartig et al. |
| 6,114,043 A | 9/2000 | Joret |
| 6,132,881 A | 10/2000 | Hartig et al. |
| 6,159,607 A | 12/2000 | Hartig et al. |
| 6,410,173 B1 * | 6/2002 | Arfsten et al. ............... 351/166 |
| 6,445,503 B1 | 9/2002 | Lingle |
| 6,447,891 B1 | 9/2002 | Veerasamy et al. |
| 6,461,731 B1 | 10/2002 | Veerasamy et al. |
| 2001/0041252 A1 | 11/2001 | Laird |
| 2002/0031674 A1 | 3/2002 | Laird |

* cited by examiner

LOW-E MATCHABLE COATED ARTICLES, AND METHODS

This application claims priority from U.S. Provisional 60/318,676, filed Sep. 13, 2001, incorporated hereinto by reference.

This invention relates to low-E coated articles that have approximately the same color characteristics as viewed by the naked eye both before and after heat treatment (e.g., thermal tempering), and corresponding methods. Such articles may in certain embodiments combine: (1) high visible transmission characteristics, (2) good durability before and/or after heat treatment, and/or (3) a low $\Delta E^*$ value which is indicative of color stability upon heat treatment (HT). Such coated articles may be used monolithically, in insulating glass (IG) units, laminated window units, vehicle windshields, and/or other vehicle or architectural applications.

BACKGROUND OF THE INVENTION

Low-emissivity (low-E) coating systems are known in the art. For example, commonly owned U.S. Pat. No. 5,376,455 discloses: glass/$Si_3N_4$/NiCr/Ag/NiCr/$Si_3N_4$.

The need for substantial matchability (before heat treatment vs. after heat treatment) is known. Glass substrates are often produced in large quantities and cut to size in order to fulfill the needs of a particular situation such as a new multi-window and door office building, vehicle window needs, etc. It is often desirable in such applications that some of the windows and/or doors be heat treated (i.e., tempered, heat strengthened or heat-bent) while others need not be. Office buildings often employ IG units and/or laminates for safety and/or thermal control. It is desirable that the units and/or laminates which are heat treated (HT) substantially match their non-heat treated counterparts (e.g., with regard to color, reflectance, and/or the like, at least on the glass side) for architectural and/or aesthetic purposes. Moreover, in certain example but non-limiting situations, good durability after HT (e.g., scratch resistance and/or chemical durability) may reduce the need for edge deletion so as to reduce window fabrication costs.

Commonly owned U.S. Pat. No. 5,688,585 discloses a solar control coated article including: glass/$Si_3N_4$/NiCr/$Si_3N_4$. One object of the '585 patent is to provide a sputter coated layer system that after heat treatment (HT) is matchable colorwise with its non-heat treated counterpart. While the coating systems of the '585 patent are excellent for their intended purposes, they suffer from certain disadvantages. In particular, they tend to have rather high emissivity and/or sheet resistance values (e.g., because no silver (Ag) layer is disclosed in the '585 patent).

It has in the prior art been possible to achieve matchability in systems other than those of the aforesaid '585 patent, but only between two different layer systems, one of which is heat treated and the other is not. The necessity of developing and using two different layer systems to achieve matchability creates additional manufacturing expense and inventory needs which are undesirable.

U.S. Pat. Nos. 6,014,872 and 5,800,933 (see Example B) disclose a heat treatable low-E layer system including: glass/$TiO_2$/$Si_3N_4$/NiCr/Ag/NiCr/$Si_3N_4$. Unfortunately, when heat treated this low-E layer system is not approximately matchable colorwise with its non-heat treated counterpart (as viewed from the glass side). This is because this low-E layer system has a $\Delta E^*$ (glass side) value greater than 4.1 (i.e., for Example B, $\Delta a^*_G$ is 1.49, $\Delta b^*_G$ is 3.81, and $\Delta L^*$ (glass side) is not measured; using Equation (1) below then $\Delta E^*$ on the glass side must necessarily be greater than 4.1 and is probably much higher than that).

U.S. Pat. No. 5,563,734 discloses a low-E coating system including: substrate/$TiO_2$/$NiCrN_x$/Ag/$NiCrN_x$/$Si_3N_4$. Unfortunately, it has been found that when high Nitrogen (N) flow rates are used when forming the $NiCrN_x$ layers (see the high N flow rate of 143 sccm in Table 1 of the '734 patent; translating into about 22 sccm/kW), the resulting coated articles are not color stable with heat treatment (i.e., they tend to have high $\Delta E^*$ (glass side) values greater than 6.0). In other words, if subjected to HT, the '734 patent low-E layer system would not be approximately matchable colorwise with its non-heat treated counterpart (as viewed from the glass side). Moreover, '734 layer systems tend to lack good durability after HT, as they are susceptible to scratching, due to the high nitrogen gas flow used in making the same.

Moreover, it is sometimes desirable for a coated article to have high visible transmission characteristics and/or good durability (mechanical and/or chemical). Unfortunately, certain known steps that are taken to improve visible transmission characteristics and/or pre-HT durability tend to degrade post-HT durability. Thus, it is often difficult to obtain a combination of high visible transmission and good durability.

In view of the above, it will be apparent to those skilled in the art that there exists a need for a low-E coating or layer system that after HT substantially matches in color and/or reflection (as viewed by a naked human eye from the glass side) its non-heat treated counterpart. In other words, there exists a need in the art for a low-E matchable coating or layering system. There also exists a need in the art for a heat treatable system that can combine: (1) high visible transmission characteristics, (2) good durability before and/or after heat treatment, and/or (3) a low $\Delta E^*$ value which is indicative of color stability upon heat treatment.

It is a purpose of this invention to fulfill one or more of the above-listed needs, and/or other needs which will become more apparent to the skilled artisan once given the following disclosure.

SUMMARY OF THE INVENTION

An object of this invention is to provide a low-E coating or layer system that has good color stability with heat treatment (HT).

Another object of this invention is to provide a low-E matchable coating or layering system.

Another object of this invention is to provide a low-E coating or layering system that combines high visible transmission characteristics, good durability before and/or after heat treatment, and/or a low $\Delta E^*$ value which is indicative of color stability upon heat treatment (HT). This combination may be achieved in certain example non-limiting embodiments of this invention by providing a coating including at least one barrier layer that is at least partially nitrided, and which is heat treatable. In this regard, an example coating or layer system may include an IR reflecting layer (e.g., Ag, Au, or the like) sandwiched between first and/or second metal inclusive partially nitrided barrier layers (e.g., of or including $NiCrN_x$ or other Ni inclusive alloy). In certain embodiments, both the first and second barrier layers may be partially nitrided (e.g., $NiCrN_x$), while in other embodiments only one of the barrier layers need be partially nitrided (e.g., first barrier layer of or including $NiCrN_x$, and the second barrier layer of or including NiCr).

Herein, the term "nitrided" means and covers both fully nitrided and only partially nitrided.

Another object of this invention is to provide a coating or layer system designed by adjusting nitriding of at least one barrier layer and adjusting layer thickness(es) in order to obtain a coating or layer system that is capable of combining high visible transmission characteristics, good durability, and/or a low $\Delta E^*$ value which is indicative an article that when heat treated is substantially matchable to its non-heat treated counterpart.

Another object of this invention is to fulfill one or more of the above-listed objects.

Certain example embodiments of this invention fulfill one or more of the above-listed objects and/or needs by providing a coated article comprising:
- a layer system supported by a glass substrate, said layer system comprising an infrared (IR) reflecting silver layer located between and in contact with first and second metal inclusive barrier layers; and
- wherein said coated article is characterized by:
    (a) a visible transmittance of at least 70%;
    (b) a $\Delta E^*$ value (glass side) no greater than 3.5 after or due to heat treatment (HT); and
    (c) good mechanical and/or chemical durability before and/or after HT.

Certain other example embodiments of this invention fulfill one or more of the above-listed objects by providing a coated article comprising:
- a layer system supported by a glass substrate, said layer system comprising an infrared (IR) reflecting silver layer located between and in contact with first and second metal inclusive barrier layers; and
- wherein at least said first metal inclusive barrier layer is at least partially nitrided to an extent so that said coated article has a $\Delta E^*$ value (glass side) no greater than 3.5 after or due to heat treatment (HT).

Other embodiments of this invention fulfill one or more of the above listed objects and/or needs by providing a coated article including a layer system supported by a substrate, the coated article comprising:
- a first dielectric layer on said substrate;
- an IR reflecting layer sandwiched between first and second barrier layers, each of said IR reflecting layer and said barrier layers overlying said first dielectric layer;
- a second dielectric layer overlying each of said first dielectric layer, said barrier layers and said IR reflecting layer; and
- wherein at least one of said barrier layers comprises a metal nitride that is nitrided to an extent so that the coated article has a $\Delta E^*$ value (glass side) no greater than 3.5 after or due to heat treatment (HT).

In certain embodiments, one or both of the barrier layers may comprise $NiCrN_x$.

In other embodiments, certain example embodiments of this invention fulfills one or more of the above-listed objects and/or needs by providing a method of making a coated article, the method comprising:
- depositing a layer system on a glass substrate, the layer system including an infrared (IR) reflecting metal layer located between and in contact with first and second metal inclusive layers, at least one of the metal inclusive layers being nitrided to some extent, wherein prior to heat treatment the glass substrate with the layer system thereon has a sheet resistance $R_s$ no greater than 20 ohms/square; and
- heat treating the substrate with the layer system thereon so that due to said heat treating the resulting substrate with the layer system thereon has a $\Delta E^*$ value (glass side) no greater than 3.5.

This invention will now be described with respect to certain embodiments thereof as illustrated in the following drawings, wherein.

IN THE DRAWINGS

DETAILED DESCRIPTION OF CERTAIN EXEMPLARY EMBODIMENTS OF THE INVENTION

Certain embodiments of this invention provide a coating or layer system that may be used in applications such as IG or monolithic window units, architectural windows, vehicle windows (e.g., windshields, backlites, etc.), and/or other suitable applications. Certain embodiments of this invention provide a layer system that combines high visible transmission, good durability (mechanical and/or chemical) before and/or after HT, and good color stability upon heat treatment. It will be shown herein how certain layers stacks surprisingly enable this unique combination.

With regard to color stability, certain embodiments of this invention have excellent color stability (i.e., a low value of $\Delta E^*$ and/or a low value of $\Delta a^*$; where $\Delta$ is indicative of change in view of heat treatment) with heat treatment (e.g., thermal tempering, bending, or thermal heat strengthening) monolithically and/or in the context of dual pane environments such as IG units or windshields. Such heat treatments (HTs) often necessitate heating the coated substrate to temperatures of at least about 1100° F. (593° C.) and up to 1450° F. (788° C.) [more preferably from about 1100 to 1200 degrees F., and most preferably from 1150–1200 degrees F.] for a sufficient period of time to insure the end result (e.g., tempering, bending, and/or heat strengthening). Certain embodiments of this invention combine (i) color stability with heat treatment, and (ii) the use of a silver inclusive layer for selective IR reflection. Certain embodiments of this invention combine (i) and (ii), along with (iii) high visible transmission, (iv) good durability, and/or (v) color in the blue-green quadrant (i.e., third quadrant) of the CIE LAB color chart when applied to a clear and/or green glass substrate, although this invention may certainly be used in the context of other colors. Certain embodiments of this invention combine (i) through (v), along with (iv) low-emissivity characteristics.

Figure 1:
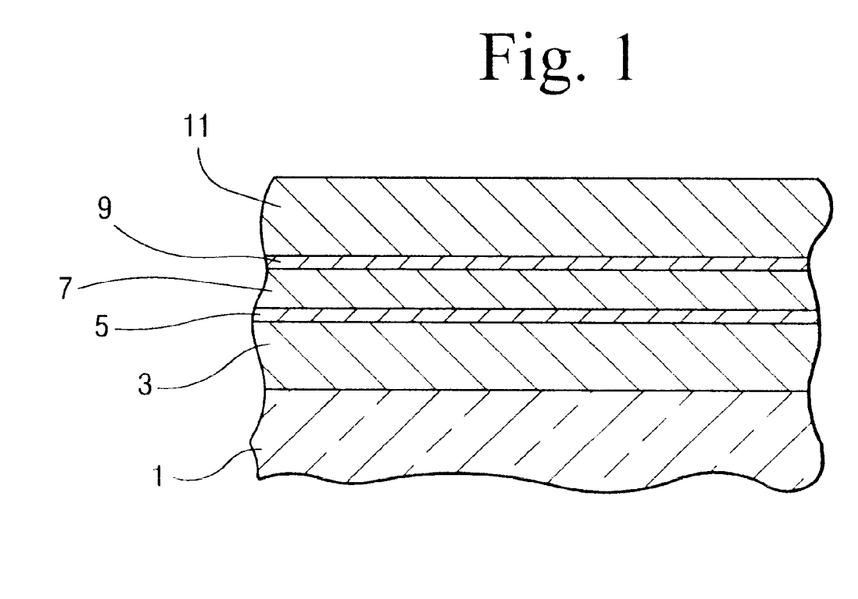
FIG. 1 is a partial side cross sectional view of an embodiment of a layer system according to this invention.

FIG. 1 is a side cross sectional view of a coated article according to an embodiment of this invention. The coated article includes substrate 1 (e.g., clear, green, bronze, grey, blue, or blue-green glass substrate from about 1.0 to 12.0 mm thick), first dielectric layer 3 (e.g., of or including silicon nitride (e.g., $Si_3N_4$), titanium dioxide, tantalum pentaoxide, zirconium oxide, silicon zirconium nitride, tin oxide, silicon oxide, silicon dioxide, or silicon oxynitride), first metal inclusive partially nitrided barrier layer 5 (e.g., of or including $NiCrN_x$ and/or $CrN_x$), IR reflecting layer 7 (e.g., of or including Ag, Au or the like), second or overlying metal inclusive barrier layer 9 which may optionally also be at least partially nitrided (e.g., of or including Ni, NiCr, Cr, $NiCrN_x$ and/or $CrN_x$), and second or overcoat dielectric layer 11 (e.g., of or including silicon nitride (e.g., $Si_3N_4$), titanium dioxide, tantalum pentaoxide, silicon zirconium nitride, zirconium oxide, tin oxide, silicon oxide, silicon dioxide, or silicon oxynitride). Other layer(s) below or above the illustrated coating system may also be provided. Thus, while the coating or layer system is "on" or "supported by" substrate 1 (directly or indirectly), other layer(s) may be provided therebetween. Thus, for example, the layer system of FIG. 1 may be considered "on" the substrate 1 even though other layer(s) are provided therebetween (e.g., a $TiO_2$ layer may be provided between substrate 1 and dielectric layer 3 when layer 3 comprises silicon nitride). Additionally, those skilled in the art will recognize that the coating or layer system 3–11 of FIG. 1 may be provided as illustrated, or alternatively may be repeated on top of itself one or more times so as to form a double or triple silver layer stack.

IR reflecting layer 7 preferably is of or including Ag metal, although it is possible that some small amount of oxidation could occur with respect thereto. Thus, layer 7 is no more than about 10% oxidized, more preferably no more than about 1% oxidized, and most preferably no more than 0.5% oxidized in certain embodiments of this invention.

Surprisingly, it has been found that by controlling the nitrogen (N) flow used during sputtering of barrier layer(s) 5 and/or 9, and/or by controlling the thickness(es) of layers 5 and/or 9, a resulting coated article can be achieved which combines high visible transmission, good durability before and/or after HT, and good color stability upon heat treatment (HT). For example, by controlling the amount that barrier layer(s) 5 and/or 9 is/are nitrided (due to N gas flow during sputtering) at low to moderate levels and/or the thickness of the same at the low to moderate gas flow level(s), a resulting coated article with a lower $\Delta E^*$ value can be achieved. The Examples below illustrate, for example and without limitation, the surprising unfortunate findings that color stability degrades (i.e., $\Delta E^*$ increases) and/or post-HT durability degrades at high $N_2$ gas flows for the barrier layers. However, it was surprisingly found that by partially nitriding one or more of the barrier layer(s) (e.g., for durability purposes such as improving scratch resistance and/or chemical durability) at lower $N_2$ gas flows, much lower and thus better $\Delta E^*$ values are obtainable (e.g., see FIGS. 3–4) and/or better post-HT durability is obtainable. In certain embodiments of this invention, both barrier layers 5, 9 may be partially nitrided (symmetrically or asymmetrically), while in other embodiments one of the barrier layers may be partially nitrided while the other barrier layer is not (i.e., the other barrier layer includes a substantially metallic portion).

When barrier layers 5, 9 include NiCr (whether or not nitrided), the respective amounts of Ni and Cr may be, by weight percent, 80/20 nickel/chrome, 90/10 Ni/Cr, 50/50 NiCr, or any other suitable amount. Those skilled in the art will recognize that other materials may be used for barrier layers 5, 9 (e.g., other Ni inclusive alloys may be used, niobium or niobium oxide may be used, etc.). An exemplary apparatus which may be used to form the layer coating systems of this invention is a conventional sputter coating system, such as the multichamber G-49 large area flat glass sputter coater produced by Airco, Inc.

Moreover, when barrier layers 5 and 9 include NiCr (whether or not nitrided), the metals of these layers may consist of Ni and/or Cr, or alternatively a sputtering target used in forming layers 5 and/or 9 may be Inconel or Haynes 214 alloy which by weight consists essentially of (as a nominal composition):

| Element | Weight % |
|---|---|
| Ni | 75.45 |
| Fe | 4.00 |
| Cr | 16.00 |
| C | .04 |
| Al | 4.50 |
| Y | .01 |

Figure 2:
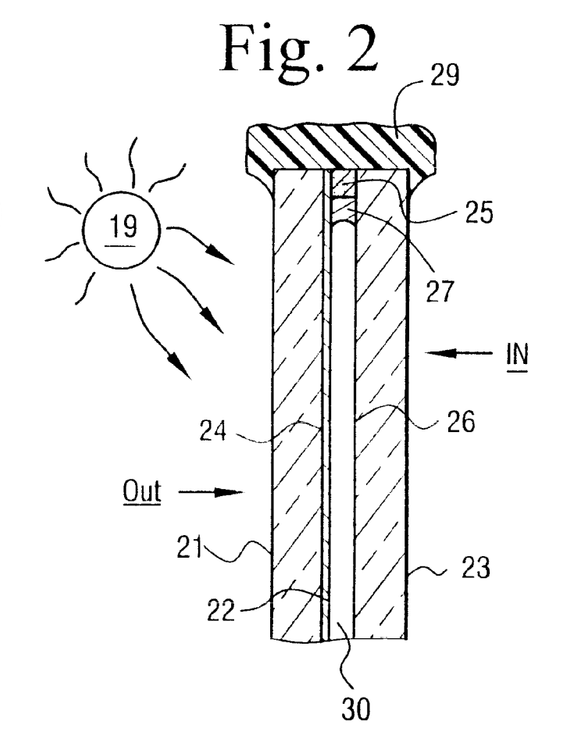
FIG. 2 is a partial cross-sectional view of an IG unit as contemplated by this invention, in which the layer system of FIG. 1 may be used.

FIG. 2 illustrates the coating or layer system 22 of FIG. 1 being utilized on surface #2 of an IG window unit. In order to differentiate the "inside" of the IG unit from its "outside", the sun 19 is schematically presented on the outside. The IG unit includes outside glass pane or sheet 21 and inside glass pane or sheet 23. Coated articles herein may thus consist of one of the two sheets of the IG unit (i.e., the one coated), or alternatively the entire IG unit including both sheets. These two glass substrates (e.g., float glass 1 mm to 12 mm thick) are sealed at their peripheral edges by a conventional sealant 25 and are provided with a conventional desiccant strip 27. The panes are then retained in a conventional window or door retaining frame 29 (shown in partial schematic form). By sealing the peripheral edges of the glass sheets and replacing the air in insulating space (or chamber) 30 with a gas such as argon, a typical, high insulating value IG unit is formed. Optionally, insulating space 30 may be at a pressure less than atmospheric pressure in certain alternative embodiments, although this of course is not necessary in all embodiments. Either inner wall 24 or 26 (or both) may be provided with a layer system or coating (e.g., see FIG. 1) of this invention. In this illustrated embodiment of FIG. 2, inner wall 24 (i.e., surface #2) of outside glass sheet 21 has been provided with a sputter-coated layer system of FIG. 1 thereon.

Turning back to FIG. 1, while various thicknesses may be used consistent with one or more of the objects and/or needs discussed herein, according to certain exemplary embodiments of this invention, the preferred thicknesses and materials for the respective layers on the glass substrate 1 are as follows:

TABLE 1

| | (Thicknesses) | | |
|---|---|---|---|
| Layer Material | Preferred Range (Å) | More Preferred (Å) | Most Preferred (Å) |
| $Si_3N_4$ (layer 3) | 300–700 Å | 400–550 Å | 450–550 Å |
| $NiCrN_x$ (layer 5) | 3–30 Å | 5–15 Å | 8–9 Å |
| Ag (layer 7) | 40–120 Å | 50–100 Å | 60–80 Å |
| NiCr or $NiCrN_x$ (layer 9) | 3–30 Å | 3–12 Å | 6–7 Å |
| $Si_3N_4$ (layer 11) | 350–700 Å | 400–600 Å | 450–550 Å |

As can be seen from Table 1 above, the underlying barrier layer 5 has been nitrided, and the overlying barrier layer 9 may or may not be nitrided in different embodiments of this invention. Unexpectedly, it has been found that controlling the amount of nitriding for barrier layer(s) 5 and/or 9 at low to moderate levels can result in a coating have much improved color stability upon heat treatment (i.e., a lower $\Delta E^*$ value) (e.g., see FIGS. 3–4). Such nitriding can also improve post-HT durability. Still further, in certain example non-limiting embodiments it has been found that particular thicknesses of the overlying dielectric layer 11 result in improve $\Delta E^*$ values when the underlying dielectric layer 3 is about 0–25% thinner than the overlying dielectric layer 11, more preferably from about 5–15% thinner, and most preferably about 8–10% thinner. One or more of these features is believed to result in matchability or lower $\Delta E^*$ values (to be described below) associated with certain embodiments of this invention (i.e., improved stability with heat treatment). Any aforesaid combination of a low-E system with good stability (color and/or durability) with heat treatment is believed novel and inventive.

In certain exemplary embodiments, the stability with heat treatment results in substantial matchability between heat treated and non-heat treated versions of the coating or layer system. In other words, in monolithic and/or IG applications, in certain embodiments of this invention two glass substrates having the same coating system thereon (one heat treated after deposition and the other not heat treated) appear to the naked human eye to look substantially the same when viewed from the glass side of the product (i.e. looking through at least one substrate of glass before viewing the coating). In certain embodiments of this invention it has also been found that matchability (while achievable in monolithic applications) may even be improved in IG and/or laminate applications.

The value $\Delta E^*$ is important in determining whether or not upon heat treatment (HT) there is matchability, or substantial matchability, in the context of this invention. Color herein is described by reference to the conventional $a^*$, $b^*$ values, which in certain embodiments of this invention are both negative in order to provide color in the desired substantially neutral color range tending to the blue-green quadrant. For purposes of example, the term $\Delta a^*$ is simply indicative of how much color value $a^*$ changes due to heat treatment.

The term $\Delta E^*$ (and $\Delta E$) is well understood in the art and is reported, along with various techniques for determining it, in ASTM 2244-93 as well as being reported in Hunter et. al., *The Measurement of Appearance*, $2^{nd}$ Ed. Cptr. 9, page 162 et seq. [John Wiley & Sons, 1987]. As used in the art, $\Delta E^*$ (and $\Delta E$) is a way of adequately expressing the change (or lack thereof) in reflectance and/or transmittance (and thus color appearance, as well) in an article after or due to HT. $\Delta E$ may be calculated by the "ab" technique, or by the Hunter technique (designated by employing a subscript "H"). $\Delta E$ corresponds to the Hunter Lab L, a, b scale (or $L_h$, $a_h$, $b_h$). Similarly, $\Delta E^*$ corresponds to the CIE LAB Scale $L^*$, $a^*$, $b^*$. Both are deemed useful, and equivalent for the purposes of this invention. For example, as reported in Hunter et. al. referenced above, the rectangular coordinate/scale technique (CIE LAB 1976) known as the $L^*$, $a^*$, $b^*$ scale may be used, wherein:

$L^*$ is (CIE 1976) lightness units
$a^*$ is (CIE 1976) red-green units
$b^*$ is (CIE 1976) yellow-blue units
and the distance $\Delta E^*$ between $L^*_o a^*_o b^*_o$ and $L^*_1 a^*_1 b^*_1$ is:

$$\Delta E^* = [(\Delta L^*)^2 + (\Delta a^*)^2 + (\Delta b^*)^2]^{1/2} \quad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

where the subscript "o" represents the coating (coated article) before heat treatment and the subscript "1" represents the coating (coated article) after heat treatment; and the numbers employed (e.g., $a^*$, $b^*$, $L^*$) are those calculated by the aforesaid (CIE LAB 1976) $L^*$, $a^*$, $b^*$ coordinate technique. In a similar manner, $\Delta E$ may be calculated using equation (1) by replacing $a^*$, $b^*$, $L^*$ with Hunter Lab values $a_h$, $b_h$, $L_h$. Also within the scope of this invention and the quantification of $\Delta E^*$ are the equivalent numbers if converted to those calculated by any other technique employing the same concept of $\Delta E^*$ as defined above.

In certain embodiments of this invention, layer systems herein provided on clear monolithic glass substrates (e.g., 4 mm thick glass substrates for example reference purposes) have color as follows before heat treatment, as viewed from the glass side of the coated article ($R_G$ %):

TABLE 2

Color ($R_G$) Before Heat Treatment

|  | General | Preferred |
|---|---|---|
| a* | 0.0 to −5.0 | 0.0 to −2.0 |
| b* | −1.0 to −10.0 | −5.0 to −9.0 |

After heat treatment, in certain embodiments of this invention layer systems provided on clear monolithic glass substrates have color characteristics $\Delta E^*$ and $\Delta a^*$ as follows, when viewed from the glass (G) side (as opposed to the layer side) of the coated article:

TABLE 3

Color Characteristics ($\Delta E^*_G$) After Heat Treatment

|  | General | More Preferred | Most Preferred |
|---|---|---|---|
| $\Delta E^*_G$ | <=3.5 | <=3.0 | <=2.6 |
| $\Delta a^*_G$ | <=2.0 | <=1.0 | <=0.7 |

Accordingly, as shown in Table 3 above, coated articles according to certain embodiments of this invention have a $\Delta E^*$ value (glass side) of no greater than 3.5, more preferably no greater than 3.0, and even more preferably no greater than 2.6 (and most preferably <=2.0). When this broader range is achieved, matchability results.

EXAMPLES 1–15

Nitriding Barrier Layer(s)

The following fifteen Example coated articles (each annealed and heat treated) were made in accordance with certain embodiments of this invention. For each of the Examples 1–8, 11 and 15 the layer system was: glass/$Si_3N_4$/ $NiCrN_x$/Ag/$NiCrN_x$/$Si_3N_4$ (e.g., see FIG. 1; N gas flow during sputtering of both barrier layers 5 and 9 to nitride same), although this invention is clearly not so limited. For each of Examples 12–14 the layer system was glass/$Si_3N_4$/ $NiCrN_x$/Ag/NiCr/$Si_3N_4$ (e.g., see FIG. 1; but no N gas flow during sputtering of top barrier layer 9). Meanwhile, for each of Examples 9–10 the layer system was glass/$Si_3N_4$/ NiCr/Ag/NiCr/$Si_3N_4$ (e.g., see FIG. 1; but no N gas flow during sputtering of either barrier layer 5, 9). It will be shown below that Examples 9–10 (no N gas flow for layers 5, 9) lack durability relative to the Examples where N gas flow was used during sputtering of one or more of the barrier layers. Moreover, it will be shown that by controlling N gas flow during sputtering of one or both barrier layers, the ΔE* value of the resulting coating or layer system can be improved (i.e., reduced). In each of these Examples, the substrate was of substantially clear 4 mm thick soda-lime-silica glass, and each Example was monolithic (not IG). The coater/process setups, using a BOC in-line sputter coater (BOC ILS), for the Examples were as follows.

IR reflecting layer 7 and dielectric layers 3, 11 were constant in all fifteen Examples. In each of Examples 1–15, the Ag layer 7 was metallic (sputtered using a metallic Ag planar target), about 79 Å (angstroms) thick, was sputtered at a power of about 2.95 kW, 465 V, was sputtered using an Ar gas flow of 30 sccm/kW and pressure of about 2.7 mTorr, and a line speed setting of 100 IPM (one pass) with the target masked to 0.75" opening, and had a sheet resistance value of about $R_s$=16 ohms/sq. In each of Examples 1–15, underlying $Si_3N_4$ layer 3 was about 470 Å thick, sputtered using a Si C-Mag target (Al content of about 10%), was sputtered at a power of about 1 kW, 485 V, using a gas flow of 40 sccm/kW Ar and 40 sccm/kW N and pressure of about 2.5 mTorr, at a line speed setting of 55 IPM (eight passes). In each of Examples 1–15, overlying $Si_3N_4$ layer 11 was about 510 Å thick, sputtered using a Si C-Mag target (Al content of about 10%), was sputtered at a power of about 1 kW, 485 V, using a gas flow of 40 sccm Ar and 40 sccm N, at a line speed setting of 50 IPM (eight passes).

Thus, Examples 1–15 differ in that barrier layer(s) 5 and/or 9 were deposited/sputtered in different manners (e.g., different N flows and/or to different thicknesses). In sputtering barrier layers 5 and 9 in Examples 1–15, planar Ni:Cr (80/20) sputtering targets were used and 30 sccm Ar gas flow was used. However, nitrogen (N) gas flow (sccm/kW of power), line speed and power were varied in the different Examples 1–15 to achieve the different barrier layer 5, 9 thicknesses listed below. It is noted that in Table 4 below, "Bar." stands for barrier layer (e.g., Bar. 5 stands for underlying barrier layer 5, while Bar. 9 stands for overlying or second barrier layer 9 in FIG. 1). Moreover, in Table 4, "Thick" stands for thickness in Å, and "Bar. $N_2$ Fl." stands for nitrogen gas flow (sccm/kW of power) during sputtering of the relevant barrier layer.

After being sputtered onto a glass substrate as set forth above, Examples 1–15 were tested both before and after heat treatment (HT) and were found to have the following characteristics monolithically (not in a IG unit), where the HT was thermally tempering the monolithic product in a conventional furnace at approximately 1500° F. for ten minutes (note: in Table 5 and herein, a* and b* color coordinate values are in accordance with CIE LAB 1976, Ill. CIE-C 2 degree observer technique). The Ill. C, 2 degree standard was also used for visible transmission, etc. Also note that the "tape test" was performed in accordance with military standard, MIL-A-A-113, incorporated herein by reference, in order to test adhesion. The acid boil test was for 1 hour, in order to test chemical durability. With respect to the acid boil test, the tape test, brush test, and the scratch test, the results are shown on a progressive scale of 0 through 5, with 0 being the best result and 5 the worst. In particular, 0 means no change or damage (all based on visual observations), 1 means barely visible change, 2 means minor change, 3 means more obvious damage than 2 but still limited in scope, 4 means more serious damage visible than 3 but limited in area, and 5 means very serious damage up to complete failure/disintegration.

TABLE 5

Characteristics of Examples 1–15 (Monolithic)

| Value/Measurement | Before Heat Treatment | After Heat Treatment |
|---|---|---|
| EXAMPLE #1 | | |
| Transmission (TY) %: | 73.57 | 77.12 |
| $a^*_T$: | −2.35 | −2.74 |
| $b^*_T$: | −0.97 | −1.78 |
| Reflectance as viewed from glass (G) side: $R_GY$ (%): | 8.04 | 6.86 |
| $L^*_G$: | 34.06 | 31.48 |
| $a^*_G$: | −0.96 | −0.60 |
| $b^*_G$: | −7.92 | −8.06 |
| ΔE* (i.e., from glass (G) side): | | 2.6 |
| $\Delta a^*_G$ (absolute value): | | 0.36 |
| Reflectance as viewed from film/coating (F) side: $R_FY$ (%): | 3.62 | 3.53 |
| $a^*_F$: | 5.30 | 3.38 |

TABLE 4

Examples 1–15 (deposited via sputtering)

| Ex. # | Bar. 5 Mat'l | Bar. 5 Thick. | Bar. 5 $N_2$ Fl. | Bar. 9 Mat'l | Bar. 9 Thick. | Bar. 9 $N_2$ Fl. |
|---|---|---|---|---|---|---|
| 1 | $NiCrN_x$ | 12 Å | 8 sccm/kW | $NiCrN_x$ | 9 Å | 8 sccm/kW |
| 2 | $NiCrN_x$ | 9 Å | 8 sccm/kW | $NiCrN_x$ | 6 Å | 8 sccm/kW |
| 3 | $NiCrN_x$ | 6 Å | 16 sccm/kW | $NiCrN_x$ | 3 Å | 16 sccm/kW |
| 4 | $NiCrN_x$ | 9 Å | 16 sccm/kW | $NiCrN_x$ | 6 Å | 16 sccm/kW |
| 5 | $NiCrN_x$ | 9 Å | 32 sccm/kW | $NiCrN_x$ | 6 Å | 32 sccm/kW |
| 6 | $NiCrN_x$ | 12 Å | 32 sccm/kW | $NiCrN_x$ | 9 Å | 32 sccm/kW |
| 7 | $NiCrN_x$ | 6 Å | 32 sccm/kW | $NiCrN_x$ | 3 Å | 32 sccm/kW |
| 8 | $NiCrN_x$ | 12 Å | 16 sccm/kW | $NiCrN_x$ | 9 Å | 16 sccm/kW |
| 9 | NiCr | 6 Å | 0 sccm/kW | NiCr | 3 Å | 0 sccm/kW |
| 10 | NiCr | 9 Å | 0 sccm/kW | NiCr | 6 Å | 0 sccm/kW |
| 11 | $NiCrN_x$ | 6 Å | 8 sccm/kW | $NiCrN_x$ | 3 Å | 8 sccm/kW |
| 12 | $NiCrN_x$ | 9 Å | 8 sccm/kW | NiCr | 6 Å | 0 sccm/kW |
| 13 | $NiCrN_x$ | 9 Å | 8 sccm/kW | NiCr | 6 Å | 0 sccm/kW |
| 14 | $NiCrN_x$ | 9 Å | 16 sccm/kW | NiCr | 6 Å | 0 sccm/kW |
| 15 | $NiCrN_x$ | 6 Å | 8 sccm/kW | $NiCrN_x$ | 6 Å | 8 sccm/kW |

TABLE 5-continued

Characteristics of Examples 1–15 (Monolithic)

| Value/Measurement | Before Heat Treatment | After Heat Treatment |
|---|---|---|
| $b^*_F$: | −6.00 | −6.52 |
| $R_s$ (sheet resistance in ohms/sq.) | 15.50 | 12.60 |
| Tape Test: | 0 | 0 |
| Brush Test: | 1 | 0 |
| Acid Boil: | 0 | 0 |
| Scratch Test: | 2 | 1 |
| EXAMPLE #2 | | |
| Transmission (TY) %: | 75.12 | 79.52 |
| $a^*_T$: | −2.25 | −2.53 |
| $b^*_T$: | −0.81 | −0.78 |
| Reflectance as viewed from glass (G) side: $R_GY$ (%): | 7.97 | 7.05 |
| $L^*_G$: | 33.92 | 31.92 |
| $a^*_G$: | −1.11 | −1.10 |
| $b^*_G$: | −7.38 | −7.79 |
| $\Delta E^*$ (i.e., from glass (G) side): | | 2.0 |
| $\Delta a^*_G$ (absolute value): | | 0.01 |
| Reflectance as viewed from film/coating (F) side: $R_FY$ (%): | 3.89 | 3.88 |
| $a^*_F$: | 4.24 | 1.45 |
| $b^*_F$: | −6.16 | −8.05 |
| $R_s$ (sheet resistance in ohms/sq.) | 16.70 | 12.90 |
| Tape Test: | 0 | 0 |
| Brush Test: | 1 | 1 |
| Acid Boil: | 0 | 0 |
| Scratch Test: | 2 | 2 |
| EXAMPLE #3 | | |
| Transmission (TY) %: | 79.35 | 81.96 |
| $a^*_T$: | −2.07 | −1.90 |
| $b^*_T$: | −0.17 | −0.44 |
| Reflectance as viewed from glass (G) side: $R_GY$ (%): | 7.72 | 7.31 |
| $L^*_G$: | 33.39 | 32.50 |
| $a^*_G$: | −1.32 | −1.72 |
| $b^*_G$: | −6.43 | −6.80 |
| $\Delta E^*$ (i.e., from glass (G) side): | | 1.0 |
| $\Delta a^*_G$ (absolute value): | | 0.4 |
| Reflectance as viewed from film/coating (F) side: $R_FY$ (%): | 4.59 | 4.77 |
| $a^*_F$: | 2.19 | 0.31 |
| $b^*_F$: | −5.80 | −7.33 |
| $R_s$ (sheet resistance in ohms/sq.) | 17.20 | 14.30 |
| Tape Test: | 0 | 0 |
| Brush Test: | 1 | 3 |
| Acid Boil: | 0 | 1 |
| Scratch Test: | 2.5 | 2 |
| EXAMPLE #4 | | |
| Transmission (TY) %: | 75.91 | 76.81 |
| $a^*_T$: | −2.03 | −2.52 |
| $b^*_T$: | −0.75 | −2.32 |
| Reflectance as viewed from glass (G) side: $R_GY$ (%): | 8.21 | 8.68 |
| $L^*_G$: | 34.42 | 35.36 |
| $a^*_G$: | −1.71 | −1.84 |
| $b^*_G$: | −6.60 | −4.48 |
| $\Delta E^*$ (i.e., from glass (G) side): | | 2.3 |
| $\Delta a^*_G$ (absolute value): | | 0.13 |
| Reflectance as viewed from film/coating (F) side: $R_FY$ (%): | 4.20 | 4.20 |
| $a^*_F$: | 2.79 | 0.73 |
| $b^*_F$: | −5.31 | −4.80 |
| $R_s$ (sheet resistance in ohms/sq.) | 16.50 | 18.20 |
| Tape Test: | 0 | 0 |
| Brush Test: | 0 | 1 |
| Acid Boil: | 0 | 5 |
| Scratch Test: | 2 | 2 |
| EXAMPLE #5 | | |
| Transmission (TY) %: | 76.42 | 62.90 |
| $a^*_T$: | −2.23 | −1.56 |
| $b^*_T$: | −0.02 | −0.85 |
| Reflectance as viewed from glass (G) side: $R_GY$ (%): | 8.29 | 21.69 |
| $L^*_G$: | 34.57 | 53.70 |
| $a^*_G$: | −0.96 | −0.96 |
| $b^*_G$: | −7.80 | −7.80 |
| $\Delta E^*$ (i.e., from glass (G) side): | | 19.1 |
| $\Delta a^*_G$ (absolute value): | | 0 |
| Reflectance as viewed from film/coating (F) side: $R_FY$ (%): | 3.96 | 17.83 |
| $a^*_F$: | 4.38 | 4.38 |
| $b^*_F$: | −8.64 | −8.64 |
| $R_s$ (sheet resistance in ohms/sq.) | 17.20 | n/a |
| Tape Test: | 0 | 5 |
| Brush Test: | 1 | 5 |
| Acid Boil: | 0 | 5 |
| Scratch Test: | 0 | 5 |
| EXAMPLE #6 | | |
| Transmission (TY) %: | 74.35 | 69.44 |
| $a^*_T$: | −2.22 | −2.09 |
| $b^*_T$: | −0.78 | −4.55 |
| Reflectance as viewed from glass (G) side: $R_GY$ (%): | 8.46 | 14.35 |
| $L^*_G$: | 34.91 | 44.74 |
| $a^*_G$: | −1.41 | −0.97 |
| $b^*_G$: | −6.97 | 3.40 |
| $\Delta E^*$ (i.e., from glass (G) side): | | 14.3 |
| $\Delta a^*_G$ (absolute value): | | 0.44 |
| Reflectance as viewed from film/coating (F) side: $R_FY$ (%): | 3.85 | 10.70 |
| $a^*_F$: | 4.46 | 2.70 |
| $b^*_F$: | −6.7 | 5.45 |
| $R_s$ (sheet resistance in ohms/sq.) | 16.30 | n/a |
| Tape Test: | 0 | 0 |
| Brush Test: | 0 | 2 |
| Acid Boil: | 0 | 5 |
| Scratch Test: | 3 | 2 |
| EXAMPLE #7 | | |
| Transmission (TY) %: | 79.08 | 77.88 |
| $a^*_T$: | −1.72 | −2.27 |
| $b^*_T$: | −0.44 | −2.16 |
| Reflectance as viewed from glass (G) side: $R_GY$ (%): | 7.81 | 10.17 |
| $L^*_G$: | 33.59 | 38.14 |
| $a^*_G$: | −2.38 | −2.19 |
| $b^*_G$: | −5.88 | −1.72 |
| $\Delta E^*$ (i.e., from glass (G) side): | | 6.2 |
| $\Delta a^*_G$ (absolute value): | | 0.19 |
| Reflectance as viewed from film/coating (F) side: $R_FY$ (%): | 4.83 | 6.97 |
| $a^*_F$: | 0.14 | −0.46 |
| $b^*_F$: | −4.20 | −2.68 |
| $R_s$ (sheet resistance in ohms/sq.) | 16.70 | 22.70 |
| Tape Test: | 0 | 0 |
| Brush Test: | 0 | 4 |
| Acid Boil: | 0 | 5 |
| Scratch Test: | 2 | 2 |
| EXAMPLE #8 | | |
| Transmission (TY) %: | 74.04 | 71.55 |
| $a^*_T$: | −2.29 | −2.27 |
| $b^*_T$: | −0.67 | −3.36 |
| Reflectance as viewed from glass (G) side: $R_GY$ (%): | 8.36 | 10.73 |
| $L^*_G$: | 34.72 | 39.12 |
| $a^*_G$: | −1.01 | −1.46 |
| $b^*_G$: | −7.67 | −1.14 |
| $\Delta E^*$ (i.e., from glass (G) side): | | 7.9 |
| $\Delta a^*_G$ (absolute value): | | 0.45 |
| Reflectance as viewed from film/coating (F) side: $R_FY$ (%): | 3.72 | 6.92 |
| $a^*_F$: | 5.26 | 2.06 |
| $b^*_F$: | −7.58 | 0.84 |

TABLE 5-continued

Characteristics of Examples 1–15 (Monolithic)

| Value/Measurement | Before Heat Treatment | After Heat Treatment |
|---|---|---|
| $R_s$ (sheet resistance in ohms/sq.) | 15.50 | 25.80 |
| Tape Test: | 0 | 0 |
| Brush Test: | 0 | 0 |
| Acid Boil: | 0 | 4 |
| Scratch Test: | 2 | 2 |
| EXAMPLE #9 | | |
| Transmission (TY) %: | 78.92 | 81.94 |
| $a*_T$: | −2.10 | −2.27 |
| $b*_T$: | −0.13 | 0.07 |
| Reflectance as viewed from glass (G) side: $R_G Y$ (%): | 7.82 | 7.37 |
| $L*_G$: | 33.61 | 32.63 |
| $a*_G$: | −1.25 | −1.33 |
| $b*_G$: | −6.53 | −6.68 |
| ΔE* (i.e., from glass (G) side): | | 1.0 |
| Δa*_G (absolute value): | | 0.08 |
| Reflectance as viewed from film/coating (F) side: $R_F Y$ (%): | 4.58 | 4.91 |
| $a*_F$: | 2.51 | −0.35 |
| $b*_F$: | −6.55 | −6.74 |
| $R_s$ (sheet resistance in ohms/sq.) | 17.40 | 10.30 |
| Tape Test: | 0 | 0 |
| Brush Test: | 1 | 5 |
| Acid Boil: | 0 | 5 |
| Scratch Test: | 0.5 | 2.5 |
| EXAMPLE #10 | | |
| Transmission (TY) %: | 76.00 | 78.81 |
| $a*_T$: | −2.27 | −2.42 |
| $b*_T$: | 0.07 | −0.94 |
| Reflectance as viewed from glass (G) side: $R_G Y$ (%): | 8.74 | 7.28 |
| $L*_G$: | 35.49 | 32.43 |
| $a*_G$: | −1.42 | −1.38 |
| $b*_G$: | −7.00 | −7.23 |
| ΔE* (i.e., from glass (G) side): | | 3.1 |
| Δa*_G (absolute value): | | 0.04 |
| Reflectance as viewed from film/coating (F) side: $R_F Y$ (%): | 4.02 | 4.28 |
| $a*_F$: | 4.11 | 0.74 |
| $b*_F$: | −10.71 | −6.76 |
| $R_s$ (sheet resistance in ohms/sq.) | 16.40 | 12.80 |
| Tape Test: | 0 | 0 |
| Brush Test: | 0 | 4 |
| Acid Boil: | 0 | 5 |
| Scratch Test: | 2 | 2 |
| EXAMPLE #11 | | |
| Transmission (TY) %: | 79.12 | 81.72 |
| $a*_T$: | −1.91 | −2.62 |
| $b*_T$: | −0.27 | −0.89 |
| Reflectance as viewed from glass (G) side: $R_G Y$ (%): | 7.77 | 7.10 |
| $L*_G$: | 33.49 | 32.04 |
| $a*_G$: | −1.95 | −1.95 |
| $b*_G$: | −6.10 | −6.10 |
| ΔE* (i.e., from glass (G) side): | | 1.5 |
| Δa*_G (absolute value): | | 0.0 |
| Reflectance as viewed from film/coating (F) side: $R_F Y$ (%): | 4.62 | 4.62 |
| $a*_F$: | 1.20 | 1.20 |
| $b*_F$: | −5.34 | −5.34 |
| $R_s$ (sheet resistance in ohms/sq.) | 17.70 | 12.90 |
| Tape Test: | 0 | 1 |
| Brush Test: | 0 | 5 |
| Acid Boil: | 0 | 5 |
| Scratch Test: | 2 | 3 |
| EXAMPLE #12 | | |
| Transmission (TY) %: | 76.4 | 79.9 |
| $a*_T$: | −2.5 | −2.8 |
| $b*_T$: | 0.3 | −0.6 |
| Reflectance as viewed from glass (G) side: $R_G Y$ (%): | 8.5 | 7.4 |
| $L*_G$: | 35.0 | 32.7 |
| $a*_G$: | −0.6 | −0.8 |
| $b*_G$: | −8.3 | −7.9 |
| ΔE* (i.e., from glass (G) side): | | 2.4 |
| Δa*_G (absolute value): | | 0.2 |
| Reflectance as viewed from film/coating (F) side: $R_F Y$ (%): | 3.9 | 3.9 |
| $a*_F$: | 5.7 | 1.8 |
| $b*_F$: | −12.2 | −10.8 |
| $R_s$ (sheet resistance in ohms/sq.) | 16.7 | 13.2 |
| Tape Test: | 0 | 0 |
| Brush Test: | 0 | 0 |
| Acid Boil: | 0 | 3 |
| Scratch Test: | 2.5 | 1.5 |
| EXAMPLE #13 | | |
| Transmission (TY) %: | 76.7 | 79.4 |
| $a*_T$: | −2.7 | −3.0 |
| $b*_T$: | 0.5 | −0.7 |
| Reflectance as viewed from glass (G) side: $R_G Y$ (%): | 8.0 | 7.5 |
| $L*_G$: | 34.0 | 32.9 |
| $a*_G$: | −0.2 | −0.4 |
| $b*_G$: | −8.2 | −8.1 |
| ΔE* (i.e., from glass (G) side): | | 1.2 |
| Δa*_G (absolute value): | | 0.2 |
| Reflectance as viewed from film/coating (F) side: $R_F Y$ (%): | 3.9 | 3.9 |
| $a*_F$: | 6.1 | 2.7 |
| $b*_F$: | −8.6 | −11.2 |
| $R_s$ (sheet resistance in ohms/sq.) | 17.1 | n/a |
| Tape Test: | n/a | n/a |
| Brush Test: | n/a | n/a |
| Acid Boil: | n/a | n/a |
| Scratch Test: | n/a | n/a |
| EXAMPLE #14 | | |
| Transmission (TY) %: | 75.5 | 79.1 |
| $a*_T$: | −2.3 | −2.6 |
| $b*_T$: | −0.5 | −1.2 |
| Reflectance as viewed from glass (G) side: $R_G Y$ (%): | 8.3 | 7.4 |
| $L*_G$: | 34.6 | 32.8 |
| $a*_G$: | −1.2 | −1.3 |
| $b*_G$: | −7.5 | −7.0 |
| ΔE* (i.e., from glass (G) side): | | 1.9 |
| Δa*_G (absolute value): | | 0.1 |
| Reflectance as viewed from film/coating (F) side: $R_F Y$ (%): | 3.9 | 4.2 |
| $a*_F$: | 4.6 | 1.2 |
| $b*_F$: | −8.6 | −7.6 |
| $R_s$ (sheet resistance in ohms/sq.) | 16.6 | 13.5 |
| Tape Test: | 0 | 0 |
| Brush Test: | 0 | 2 |
| Acid Boil: | 0 | 3 |
| Scratch Test: | 2 | 3.5 |
| EXAMPLE #15 | | |
| Transmission (TY) %: | 77.7 | 81.4 |
| $a*_T$: | −2.3 | −2.8 |
| $b*_T$: | 0.1 | −0.7 |
| Reflectance as viewed from glass (G) side: $R_G Y$ (%): | 7.9 | 6.8 |
| $L*_G$: | 33.7 | 31.4 |
| $a*_G$: | −0.5 | −0.5 |
| $b*_G$: | −8.0 | −7.9 |
| ΔE* (i.e., from glass (G) side): | | 2.4 |
| Δa*_G (absolute value): | | 0.0 |
| Reflectance as viewed from film/coating (F) side: $R_F Y$ (%): | 4.2 | 4.1 |
| $a*_F$: | 4.4 | 1.3 |
| $b*_F$: | −8.7 | −8.7 |
| $R_s$ (sheet resistance in ohms/sq.) | 17.0 | 13.3 |

TABLE 5-continued

Characteristics of Examples 1–15 (Monolithic)

| Value/Measurement | Before Heat Treatment | After Heat Treatment |
|---|---|---|
| Tape Test: | 0 | 0 |
| Brush Test: | 0 | 2 |
| Acid Boil: | 0 | 3 |
| Scratch Test: | 2 | 2 |

As can be seen from the above, it can be seen that each of Examples 1–4 and 12–15 had good results in terms of each of (a) good matchability because, as viewed from the glass (G) side of the respective articles, $\Delta E^*$ was no greater than 2.5, and preferably no greater than 2.0; (b) high visible transmission of at least 70% (even more preferably at least 74% in certain embodiments); and (c) good durability in terms of overall results of the tape test, brush test, acid boil test and/or scratch test both before and after HT. It is most desirable to have coated articles which are satisfactory in all three (a)–(c) of these areas. Moreover, each of Examples 1–4 and 12–15 was deemed heat treatable in that the coating was not damaged in HT (e.g., no peeling, pinholes, cracks or haze). Unfortunately, Examples 5–8 had bad results in terms of matchability (i.e., very high $\Delta E^*$ values from the glass side). The bad matchability (before vs. after HT) results associated with Examples 5–8 are believed to be a result of (i) barrier layer thickness and/or (ii) the high nitrogen (N) gas flow used during deposition of the barrier layer(s). For example, Examples 1–2 (best overall combination of durability and matchability before vs. after HT) each used 8 sccm/kW nitrogen flow in sputtering barrier layer(s), while Examples 5–7 (bad matchability before vs. after HT) used a much higher nitrogen gas flow of 32 sccm/kW during barrier layer deposition. A comparison between Examples 3–4 versus Example 8 illustrates that barrier layer(s) thickness is also important (i.e., given a N flow rate of 16 sccm/kW, the lower barrier layer thickness(es) in Examples 3–4 render these coated articles matchable before vs. after HT, while the higher barrier layer(s) thickness(es) in Example 8 causes this latter coated article to have too high of a $\Delta E^*$ value 7.9 and thus bad matchability). Examples 9–10 had good matchability, but bad durability (e.g., bad brush test results); this is believed to be due to the fact that there was no N flow during sputtering of the barrier layers. However, Examples 12–14 (N flow during sputtering of lower barrier layer 5, but not upper barrier layer 9) illustrate that good results with regard to matchability and durability can be obtained when only one (e.g., the lower) of the barrier layers is intentionally nitrided (i.e., according to this invention, N flow for the opposing barrier layers 5, 9 may be symmetrical or asymmetrical). Accordingly, it can be seen that by controlling the nitrogen flow during sputtering of one or both barrier layer(s) 5, 9, the combination of high transmission, matchability and/or good durability can be obtained which is a significant improvement over the prior art. Controlling barrier layer thickness is also shown to be an important factor in reducing $\Delta E^*$ values and thus providing good matchability.

For example, and without limitation, good matchability combined with high visible transmission and/or good durability both before and after HT can be obtained when the N flow during sputtering of the lower barrier layer 5 is from 0–16 sccm/kW, more preferably from 4–12 sccm/kW (most preferably 6–10 sccm/kW), and the N flow during sputtering of the upper barrier layer 9 is from 0–16 sccm/kW, more preferably from 0–8 sccm/kW, and most preferably from 0–4 sccm/kW. Surprisingly, moderate $N_2$ flow during barrier layer(s) sputtering has been found to produce the most durable coated articles combined with matchability. In some embodiments of this invention, both barrier layers 5, 9 may be sputtered using N flow, while in other embodiments of this invention the lower barrier layer 5 may be sputtered using N flow while the top layer 9 is not (i.e., top barrier layer 9 may be metallic, e.g., NiCr, in certain embodiments). Moreover, the two barrier layers 5, 9 may be approximately the same thickness in certain embodiments, while in other embodiments they may be of different thicknesses (e.g., the top barrier layer 9 may be thinner and/or less nitrided).

Surprisingly, it has also been found that controlling the thickness of dielectric layer(s) 3 and/or 11 can contribute to good matchability and/or durability. In particular, it has been found that good matchability (i.e., color stability upon HT) is achieved when the upper dielectric layer (when silicon nitride) 11 is about 510 Å thick, or slightly more than this. The lower dielectric layer (when silicon nitride) 3 is then provided at a thickness from about 5–20%, more preferably about 10%, less than that of upper dielectric layer 11. While other thicknesses of these layers may of course be used in different embodiments of this invention, these particular thicknesses have been found to be particularly good. Moreover, it has been found that, when silicon nitride, fully nitrided silicon nitride layers 3, 11 have been found to produce more stable coatings. However, in other embodiments, Si-rich silicon nitride may be used, and/or other stochiometries with respect to these dielectric layers.

From the Examples above, it can be seen that monolithic coated articles according to certain embodiments of this invention preferably have a visible transmittance (TY %) of at least about 65% before and/or after HT, more preferably of at least about 70% before and/or after HT, and most preferably at least about 75% after HT. IG units have similar transmittance according to certain embodiments of this invention. Additionally, monolithic coated articles according to certain embodiments of this invention preferably have a glass side reflectance value ($R_GY$ %) of no more than 10%, and more preferably no more than 8% before and/or after HT. Furthermore, coatings according to certain embodiments of this invention have a sheet resistance R, of no greater than about 25 ohms/square before and/or after HT, more preferably no greater than about 20 ohms/square before and/or after HT, and most preferably no greater than about 15 ohms/square after HT (low emissivity/emittance values are related thereto). Additionally, in certain embodiments of this invention, barrier layers 5 and/or 9 is/are not more than 75% nitrided, more preferably not more than 50% nitrided.

Figure 3:
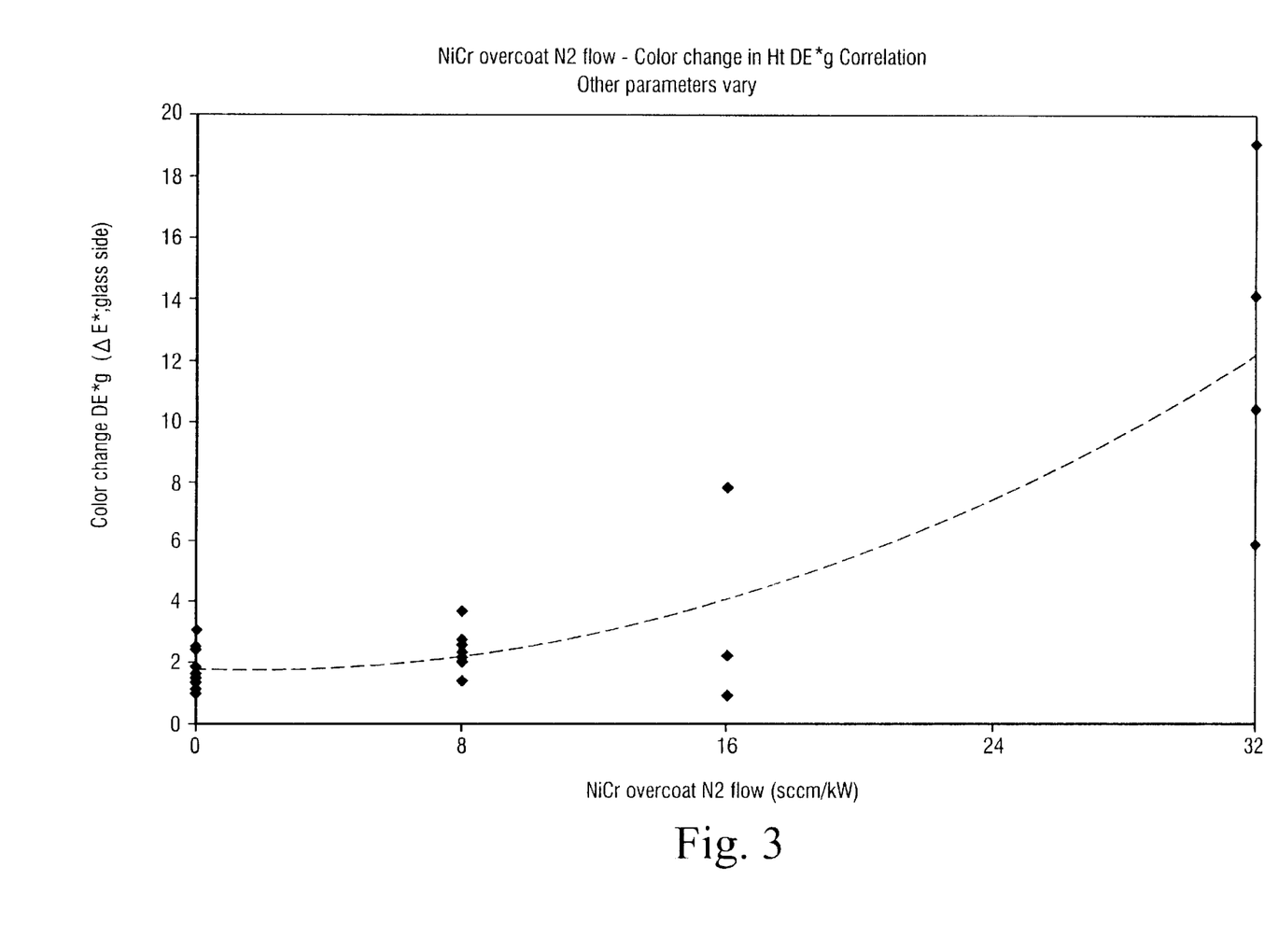
FIG. 3 is a graph plotting nitrogen gas flow for the undercoat (i.e., lower) barrier layer versus glass side color stability upon HT (i.e., $\Delta E^*$ (glass side)), illustrating that color stability with HT degrades by causing $\Delta E^*$ to increase (i.e., get worse) as nitrogen flow increases.
Figure 4:
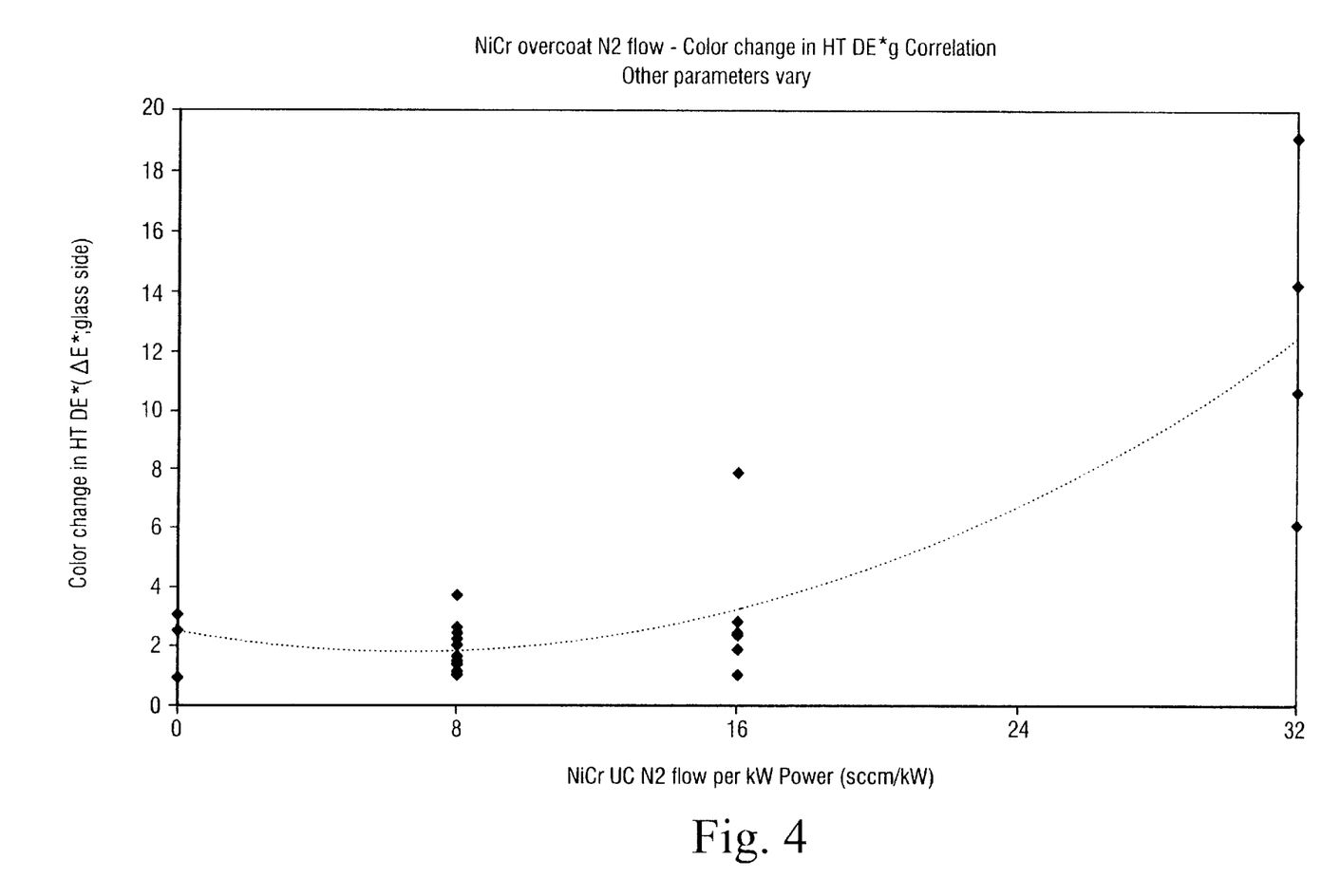
FIG. 4 is a graph plotting nitrogen gas flow for the overcoat (i.e., upper) barrier layer versus glass side color stability upon HT (i.e., $\Delta E^*$ (glass side)), illustrating that color stability with HT degrades by causing $\Delta E^*$ to increase (i.e., get worse) as nitrogen flow increases.

FIGS. 3–4 plot the results of certain Examples in terms of nitrogen gas flow for a barrier layer versus stability with HT (i.e., $\Delta E^*$ (glass side)). In particular, FIG. 3 plots nitrogen gas flow for the undercoat (i.e., lower) barrier layer 5 versus glass side color stability upon HT (i.e., $\Delta E^*$ (glass side)), illustrating that color stability with HT gets worse (i.e., $\Delta E^*$ increases) as nitrogen gas flow during sputtering of barrier layer 5 increases. In a similar manner, FIG. 4 plots nitrogen gas flow for the overcoat barrier layer 9 versus glass side color stability upon HT (i.e., $\Delta E^*$ (glass side)), illustrating that color stability with HT gets worse (i.e., $\Delta E^*$ increases) as nitrogen gas flow during sputtering of barrier layer 9 increases. Accordingly, it can be seen that extremely high nitrogen gas flows may be undesirable in certain instances if the same causes $\Delta E^*$ to be undesirably high.

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_xY$ or $R_x$ (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB a*, b* coordinates and scale (i.e. the CIE a*b* diagram, Ill. CIE-C, 2 degree observer). Other similar coordinates may be equivalently used such as by the subscript "h" to signify the conventional use of the Hunter Lab Scale, or Ill. CIE-C, $10°$ observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emittance" and "transmittance" are well understood in the art and are used herein according to their well known meaning. Thus, for example, the term "transmittance" herein means solar transmittance, which is made up of visible light transmittance (TY), infrared radiation transmittance, and ultraviolet radiation transmittance. Total solar energy transmittance (TS) is then usually characterized as a weighted average of these other values. With respect to these transmittances, visible transmittance, as reported herein, is characterized by the standard CIE Illuminant C, 2 degree observer, technique at 380–720 nm; near-infrared is 720–2500 nm; ultraviolet is 300–800 nm; and total solar is 300–2500 nm. For purposes of emittance, however, a particular infrared range (i.e. 2,500–40,000 nm) is employed.

Visible transmittance can be measured using known, conventional techniques. For example, by using a spectrophotometer, such as a Perkin Elmer Lambda 900 or Hitachi U4001, a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectrogard spectrophotometer manufactured by Pacific Scientific Corporation. This device measures and reports visible transmittance directly. As reported and measured herein, visible transmittance (i.e. the Y value in the CIE tristimulus system, ASTM E-308-85) uses the Ill. C.,2 degree observer.

Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emittance as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

"Chemical durability" or "chemically durable" is used herein synonymously with the term of art "chemically resistant" or "chemical stability". Chemical durability is determined by boiling a 2"×5" sample of a coated glass substrate in about 500 cc of 5% HCl for one hour (i.e. at about 220° F.) (i.e. acid boil test above). The sample is deemed to pass this test (and thus the layer system is "chemically resistant" or is deemed to be "chemically durable" or to have "chemical durability") if the sample's layer system gets a score of 3 or better above and no pinholes greater than about 0.003" in diameter after this one hour boil.

"Mechanical durabilility" as used herein is defined by the following tests. The test uses a Pacific Scientific Abrasion Tester (or equivalent) wherein a 2"×4"×1" nylon brush is cyclically passed over the layer system in 500 cycles employing 150 gm of weight, applied to a 6"×17" sample (i.e., brush test above). In this test, if no substantial, noticeable scratches appear when viewed with the naked eye under visible light, the test is deemed passed, and the article is said to be "mechanically durable" or to have "mechanical durability" (i.e., score of 2 or better above).

The terms "heat treatment" and "heat treating" as used herein mean heating the article to a temperature sufficient to enabling thermal tempering, bending, or heat strengthening of the glass inclusive article. This definition includes, for example, heating a coated article to a temperature of at least about 1100 degrees F. (e.g., to a temperature of from about 550 degrees C. to 900 degrees C.) for a sufficient period to enable tempering or heat bending.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A heat treated coated article comprising:
    a layer system supported by a glass substrate, said layer system comprising an infrared (IR) reflecting silver layer located between and in contact with first and second metal inclusive barrier layers; and
    wherein at least said first metal inclusive barrier layer is at least partially nitrided to an extent so that said coated article has a $\Delta E^*$ value (glass side) no greater than 3.5 after or due to heat treatment (HT).

2. The coated article of claim 1, wherein said coated article has a $\Delta E^*$ value (glass side) no greater than 3.0 and a $\Delta a^*$ (glass side) no greater than 2.0 following or due to heat treatment, and said coated article has a visible transmission of at least 70% after HT.

3. The coated article of claim 1, wherein said coated article has a $\Delta E^*$ value (glass side) no greater than 2.6 and a $\Delta a^*$ (glass side) no greater than 1.0 following or due to thermal tempering of the coated article;
    wherein said coated article has a color characterized by $a^*_G$ and $b^*_G$ color coordinate values of the coated article both being negative both before and after heat treatment of the coated article; and
    wherein said first metal inclusive barrier layer is no more than 75% nitrided.

4. The coated article of claim 1, wherein said at least one metal inclusive barrier layer that is nitrided comprises $NiCrN_x$.

5. The coated article of claim 4, wherein both of said first and second metal inclusive barrier layers that are in contact with said IR reflecting silver layer comprise $NiCrN_x$.

6. The coated article of claim 5, wherein said coated article has good mechanical and chemical durability and a visible transmission of at least 75% after HT.

7. The coated article of claim 1, wherein at least one of said metal inclusive barrier layers comprises $CrN_x$.

8. The coated article of claim 7, wherein both of said metal inclusive barrier layers comprise Ni and Cr.

9. The coated article of claim 1, wherein said coated article has a sheet resistance value $R_s$ no greater than 20 ohms/square before and after said heat treatment.

10. The coated article of claim 9, wherein said coated article has a sheet resistance value $R_s$ no greater than 15 ohms/square after said heat treatment.

11. The coated article of claim 10, wherein both of said barrier layers comprise $NiCrN_x$.

12. The coated article of claim 1, further comprising a first dielectric layer located between said first metal inclusive barrier layer and said substrate, and a second dielectric layer overlying and in contact with said second metal inclusive barrier layer.

13. The coated article of claim 12, wherein each of said first and second dielectric layers comprises one of silicon nitride and/or titanium oxide of any suitable stochiometry.

14. The coated article of claim 1, wherein said layer system comprises the below-recited layers at the following thicknesses, where the first silicon nitride inclusive layer is located between the glass substrate and the first metal inclusive barrier layer:

| | |
|---|---|
| first silicon nitride inclusive layer: | 300–700 Å thick |
| first barrier layer comprising $NiCrN_x$: | 5–15 Å thick |
| silver layer: | 40–120 Å thick |
| second barrier layer comprising NiCr: | 3–12 Å thick |
| second silicon nitride inclusive layer: | 350–700 Å thick. |

15. The coated article of claim 14, wherein said layer system comprises the recited layers at the following thicknesses:

| | |
|---|---|
| first silicon nitride inclusive layer: | 400–550 Å thick |
| first barrier layer comprising $NiCrN_x$: | 5–15 Å thick |
| silver layer: | 50–100 Å thick |
| second barrier layer comprising NiCr: | 3–12 Å thick |
| second silicon nitride inclusive layer: | 400–600 Å thick. |

16. The coated article of claim 1, wherein the coated article makes up a portion of an insulating glass (IG) window unit, and wherein another dielectric layer is located between said glass substrate and said first silicon nitride inclusive layer.

17. A heat treated coated article including a layer system supported by a substrate, the heat treated coated article comprising:
    a first dielectric layer on said substrate;
    an IR reflecting layer sandwiched between first and second barrier layers, each of said IR reflecting layer and said barrier layers overlying said first dielectric layer;
    a second dielectric layer overlying each of said first dielectric layer, said barrier layers and said IR reflecting layer; and
    wherein at least one of said barrier layers comprises a metal nitride that is nitrided to an extent so that the coated article has a $\Delta E^*$ value (glass side) no greater than 2.6 after or due to heat treatment (HT).

18. The coated article of claim 17, wherein said at least one barrier layer that is nitrided comprises $CrN_x$.

19. The coated article of claim 18, wherein said at least one barrier layer that is nitrided comprises $NiCrN_x$.

20. The coated article of claim 17, wherein each of said barrier layers comprises $NiCrN_x$, said IR reflecting layer comprises Ag, and each of said dielectric layers comprises silicon nitride.

21. The coated article of claim 17, wherein said at least one barrier layer comprising the metal nitride is nitrided to an extent so that the metal nitride is not fully stochiometric.

22. The coated article of claim 21, wherein said at least one barrier layer is not more than 75% nitrided.

23. The coated article of claim 21, wherein said at least one barrier layer is not more than 50% nitrided.

24. A heat treated coated article including a layer system supported by a substrate, the heat treated coated article comprising:
    a first dielectric layer on said substrate;
    an IR reflecting layer sandwiched between and in contact with first and second metal inclusive layers, each of said IR reflecting layer and said metal inclusive layers overlying said first dielectric layer;
    a second dielectric layer overlying each of said first dielectric layer, said metal inclusive layers and said IR reflecting layer; and
    wherein at least one of said metal inclusive layers comprises a metal nitride that is no more than 75% nitrided so that the coated article has a $\Delta E^*$ value (glass side) no greater than 3.5 after or due to heat treatment (HT).

25. The coated article of claim 24, wherein the metal nitride is no more than 50% nitrided.

26. A method of making a heat treated coated article, the method comprising:
    depositing a layer system on a glass substrate, the layer system including an infrared (IR) reflecting metal layer located between and in contact with first and second metal inclusive layers, at least one of the metal inclusive layers being nitrided to some extent, wherein prior to heat treatment the glass substrate with the layer system thereon has a sheet resistance $R_s$ no greater than 20 ohms/square; and
    heat treating the substrate with the layer system thereon so that due to said heat treating the resulting substrate with the layer system thereon has a $\Delta E^*$ value (glass side) no greater than 3.5.

27. The method of claim 26, wherein said heat treating comprises thermally tempering the substrate with the layer system thereon.

28. The method of claim 26, wherein said depositing comprises sputtering.

29. The method of claim 26, wherein the layer system comprises, from the substrate outwardly at the following thicknesses:

| | | |
|---|---|---|
| a) | first silicon nitride inclusive layer: | 300–700 Å thick |
| b) | $NiCrN_x$ layer (said first metal inclusive layer): | 5–15 Å thick |
| c) | silver layer (said IR reflecting layer): | 40–120 Å thick |
| d) | $NiCrN_x$ layer (said second metal inclusive layer): | 3–12 Å thick |
| e) | second silicon nitride inclusive layer: | 350–700 Å thick. |

30. The method of claim 26, wherein due to said heat treating the resulting substrate with the layer system thereon has a $\Delta E^*$ value (glass side) no greater than 3.0, and a $\Delta a^*$ (glass side) no greater than 2.0.

31. The method of claim 26, wherein each of said first and second metal inclusive layers comprises $CrN_x$.

32. The method of claim 26, wherein each of said first and second metal inclusive layers comprises Ni and N.

33. The method of claim 26, wherein the at least one metal inclusive layer is nitrided, but not more than 75% nitrided.

34. The method of claim 33, wherein the at least one metal inclusive layer is not more than 50% nitrided.

* * * * *